Dec. 10, 1957   R. G. SANDBERG   2,815,978
GLARE SHIELD FOR AUTOMOBILES
Filed Jan. 20, 1956   2 Sheets-Sheet 1

INVENTOR.
Reuben G. Sandberg
BY Whitehead, Vogl & Lowe
ATTORNEYS

Dec. 10, 1957  R. G. SANDBERG  2,815,978
GLARE SHIELD FOR AUTOMOBILES
Filed Jan. 20, 1956  2 Sheets-Sheet 2

INVENTOR.
Reuben G. Sandberg
BY Whitehead, Vogl & Lowe
PER. Frank C. Lowe
ATTORNEYS

United States Patent Office 2,815,978
Patented Dec. 10, 1957

2,815,978

GLARE SHIELD FOR AUTOMOBILES

Reuben G. Sandberg, Denver, Colo.

Application January 20, 1956, Serial No. 560,372

4 Claims. (Cl. 296—97)

This invention relates to glare shield devices for automobiles and the like, and more particularly to that class of glare shield devices which form a shade spot over an individual's eyes to protect him from the glare of the sunlight, oncoming headlights and the like, and the invention will be hereinafter called a glare shield or shield, and will be referred to as being used by the driver of an automobile, although it is to be understood that the invention may also have other uses.

An object of the invention is to provide a novel and improved glare shield of the spot type which is especially adapted to be used in conjunction with conventional sun visors for shielding the eyes of the driver from the nearly horizontal rays of the sun in the early morning or late afternoon hours.

Another object of the invention is to provide such novel and improved glare shield of the spot type which relies upon the optical reflexes of the driver to permit him to clearly view objects while looking toward the sun and in a manner which minimizes secondary glare effects as from a windshield of an automobile caused by the sunlight passing through the windshield.

Yet another object of the invention is to provide such novel and improved glare shield which effectively shades the driver's eyes from the sun, and permits him to use both of his eyes in a normal manner and over a wide field of vision when looking toward the sun and in a manner which psychologically avoids unnatural optical reflexes of the type which would divert the driver's attention from the highway.

Still other objects of the invention are to provide a novel and improved glare shield which is a simple, neat appearing, easily installed, low cost, rugged, durable and effective unit.

With the foregoing and other objects in view, all of which more fully hereinafter appear, my invention comprises certain novel and improved constructions, combinations and arrangements of parts and elements as hereinafter described and defined in the appended claims, and illustrated in preferred embodiment in the accompanying drawing, in which:

The particular problem of protecting a driver's eyes when he is driving an automobile in the direction of the sun in the early morning or late evening is often vexing, and at times is hazardous, difficult and seemingly impossible to cope with. Practically all automobiles are equipped with rectangular sun visors which may be lowered from the ceiling of the automobile and which afford some protection when the sun is fairly high but when the sun is below the position of the visor they become useless. In such conditions not only does the sun blind the driver but there is a secondary glare upon the windshield, which further blinds the driver so that he cannot see objects which are not directly in line with the sun.

In the past there have been attempts to cope with this problem by the use of flat disc-like glare shields or spot shields which were attached to the windshield by various means such as suction cups, or are mounted upon swinging arms or the like, and these devices have been found to be generally unsatisfactory because the shields tended to create blind spots in the operator's field of vision and tended to cause the operator to adjust his eyes to focus upon the spots and at the windshield. This merely emphasizes the windshield glare.

It follows that there is a definite need for an improved glare shield, especially to protect an automobile driver from the sun when it is close to the horizon and with such in view, the present invention was conceived and developed, and comprises, in essence a cone-shaped glare shield, which is especially adapted to be used in conjunction with a conventional sun visor, which takes advantage of certain normal psychological optical reflexes of an individual operator to minimize the blind spot area of his vision, prevents his eyes from shifting to and focusing upon the glare shield and windshield instead of ahead of the shield, and which minimizes the effect of secondary windshield glare, all as hereinafter described in detail.

Figure 1:
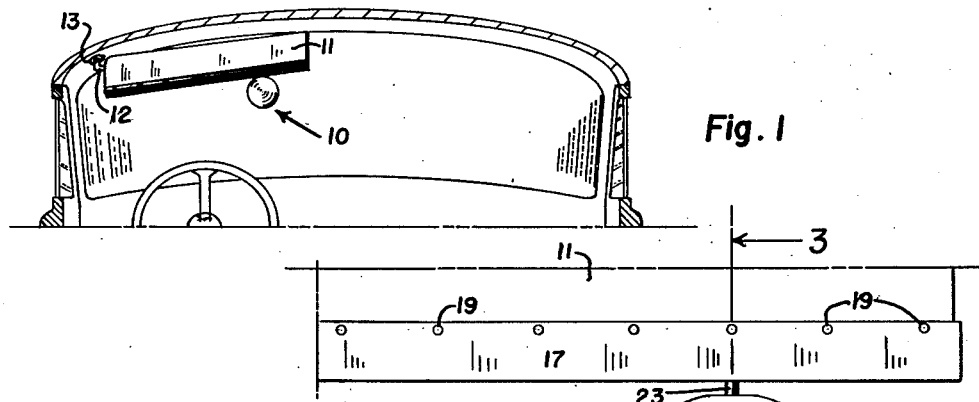
Figure 1 is a somewhat diagrammatic transverse sectional view of the forward portion of an automobile, looking forwardly toward the windshield, and illustrating my improved glare shield mounted upon the conventional sun visor.
Figure 2:
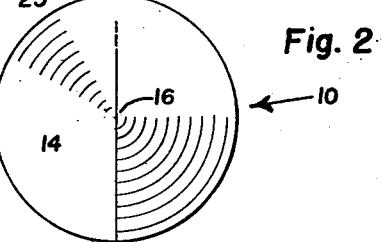
Figure 2 is an enlarged fragmentary portion of the automobile sun visor illustrated at Fig. 1, and illustrating in detail the manner in which the glare shield may be affixed thereto.
Figure 3:
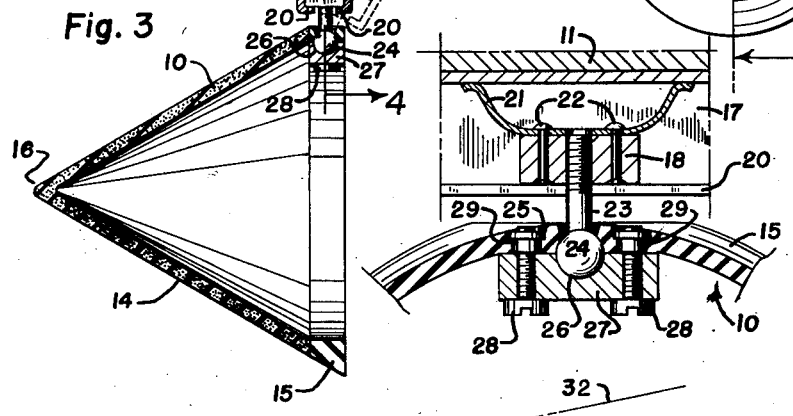
Figure 3 is a central longitudinal section of the shield and sectional fragment of the visor, as viewed from the indicated line 3—3 at Fig. 2, but on a somewhat enlarged scale.
Figure 4:
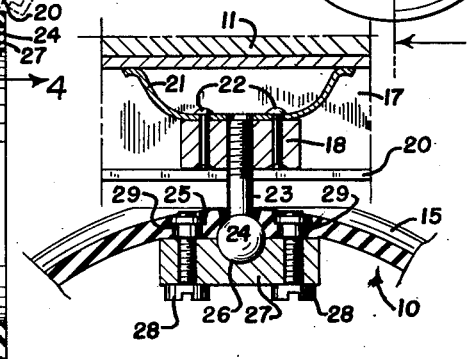
Figure 4 is a fragmentary sectional detail as viewed from the indicated line 4—4 at Fig. 3 but on a further enlarged scale.
Figure 5:
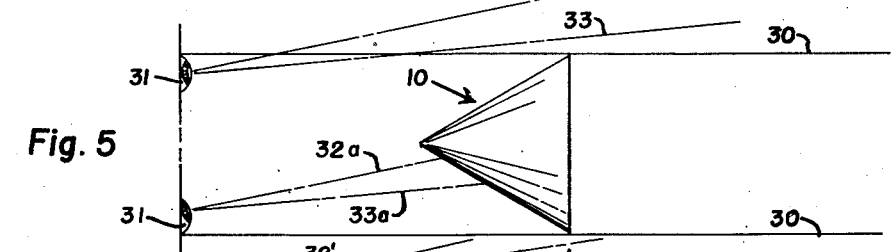
Figure 5 is a diagrammatic plan illustrating the use of the glare shield, including a representation of an individual's eyes when in use with broken lines representing the shifting of a line of sight as the individual moves his eyes.
Figure 6:
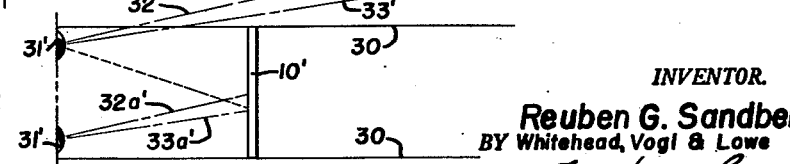
Figure 6 is a diagrammatic plan similar to Fig. 5, but showing the use of a conventional disc-type of glare shield.
Figure 7:
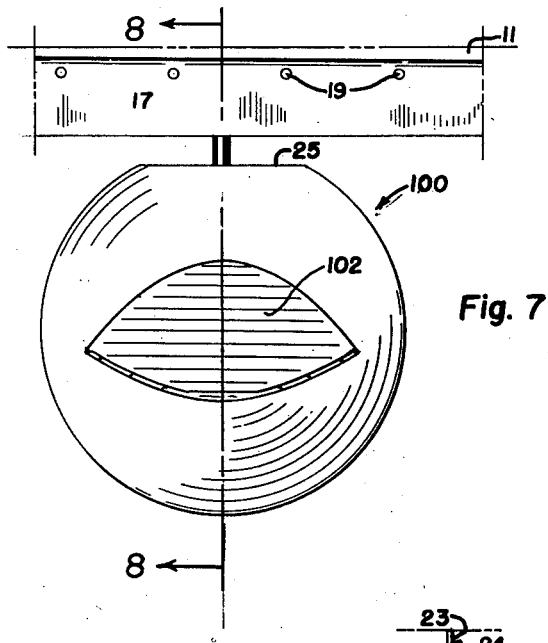
Figure 7 is an elevation view of a glare shield attached to the lower edge of a sun visor, similar to Fig. 2 but showing a modified construction.
Figure 8:
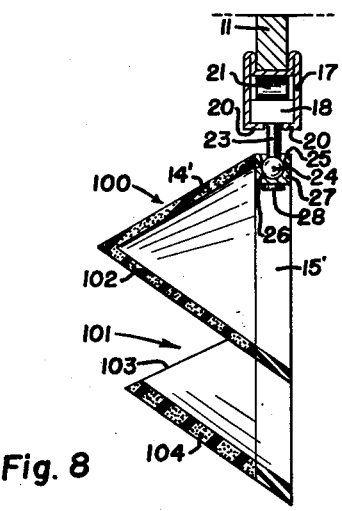
Figure 8 is a central longitudinal section of the shield and sectional fragment of the visor, as viewed from the indicated line 8—8 at Fig. 7.

Referring more particularly to the construction illustrated at Figs. 1 to 6 of the drawing, and first to Fig. 1 thereof, my improved glare shield 10 is especially adapted to be affixed to the conventional automobile sun visor 11. The sun visor 11 is a rectangular, opaque plate-like member with its upper edge swingably mounted upon a horizontally disposed arm 12, which in turn, is carried in a vertical pivot 13. With such a mount the visor may be swung or tilted to any selected position. The glare shield 10 is slidably attached to the lower edge of this sun visor 11 by a universal connection, preferably a ball and socket joint, whereby in combination with the sun visor action, any desired adjustment of the glare shield 10 is possible.

The glare shield 10 is formed as a hollow cone of soft, collapsible material to provide for safety in use and preferably, the major portion of its body 14 is sponge rubber or similar soft, resilient material, which will be easily collapsed but immediately return to shape. A base rim 15 of a more rigid type of rubber is necessary however, to provide means for mounting it to the visor. The apex 16 of the conical body is suitably rounded or blunted to avoid the possibility of eye injury should the driver be thrown forward by and against the shield as where an accident or collision occurs.

Although this glare shield 10 may be mounted upon the windshield of the automobile in various ways, the preferable mounting is at the lower edge of the conventional sun visor 11 to permit the shield 10 to depend therefrom. The sun visor permits altitudinal adjustments of the unit and also may be swung toward or away from the operator to permit adjustments of distance. To provide a shiftable connection of 10 to the visor 11, a track 17 is affixed along this lower edge of the visor and with the lower leg portions providing an elongated pocket or groove wherein a mounting slide 18 may be positioned. The attachment of the upper leg portions to the visor edge may be made in various ways as by pins 19 therethrough at spaced intervals.

The slide 18 is adapted to be held within the pocket by inturned flanges 20 at the base of the leg portions and is preferably held firmly against such flanges by a U-shaped slide spring 21 affixed to the top of the slide 18, to bear against the central transverse web of the H section of the track 17, such spring being held in position as by rivets 22. A rod 23 is threaded into this slide 18 to depend therefrom and to terminate as a ball 24 at a selected space below the lower edge of the slide.

The glare shield 10 is connected to this ball 24, at the top portion of the base rim 15 of the shield which is flattened as at 25 and socket orifice 26 is formed in the base rim 15 at this point to receive the ball 24. The ball is affixed in this socket by a socketed cap plate 27 inside the rim 15 which is pressed against the ball by screws 28 which may be threaded into ferrules 29 in the rim 15. Such connection gives the glare shield 10 a ball and socket action at the ball 24 to provide for tipping or rotating, or to allow for swingable and tiltable adjustments of the sun visor such as indicated by the broken lines in Fig. 3.

The inclined walls of the conical body 14 form the effective optical surface and such walls are preferably a dull, dark color incapable of light reflection. The operation of this unit may be compared with a conventional flat disc-like, glare shield. Actual comparisons clearly demonstrate a marked improvement in protection to the eyes, a marked improvement in the clarity in which objects in front of the windshield may be viewed and a marked reduction of the secondary glare effect at the windshield. The only explanation which seems feasible, and which appears substantially correct, is that the inclined cone construction of the surface effects the psychological optical reflexes in a manner which will not permit the driver to unconsciously focus his eyes upon the shield.

When the driver is using the shield, the sun ray lines 30 pass by each side of the driver's eyes 31 and the driver's vision extends from each side of the shield in a stereoscopic manner, shutting out only the sun and which permits even a substantial view of objects in front of the shield. A minimum blind spot is thereby attained. In driving there is a constant shifting of vision even to a small degree and the natural impulse of the driver's eyes is to view all objects in front of the shield in a stereoscopic manner and there will be an interference of vision by the shield 10. For example, if a visual ray 32 of the driver's left eye is on an object which holds his attention, that eye shifts and focuses to that object. At the same time the right eye shifts and focuses to a similar ray 32a onto the cone as a natural reflex. However, when the shield blocks the view of the right eye, there is a subconscious tendency for the right eye to focus to the shield 10 at the distance where ray 32a meets the conical surface of the shield and there is a conflict between the eye reflexes. Since there is a constant shifting of vision during driving the visual ray 32 will quickly shift to a second position 33, and the ray 32a of the right eye shifts to the second position 33a. The conical surface of the shield 10 will change the focal distance of the right eye and the subconscious tendency for the right eye to focus onto the cone is complicated by the need for a constant change of focal length which could become very difficult where there is a constant shifting of the eyes as to view objects ahead of the shield in the highway. The result is that any tendency of the driver to focus his eyes and attention to the glare shield 10 and at the windshield of the automobile is eliminated. At the same time the secondary glare effect at the windshield is minimized.

The conventional shield 10' which is no more than an opaque disc at a windshield has a different effect in a situation above described, for when the right eye shifts from a position 32a' on the shield to a second position 33a' the focal depth remains substantially the same and there is a strong tendency for the eyes to subconsciously adjust to this depth of focus and to swing both eyes to the shield. The subsequent blinding effect results in the driver not being able to clearly focus his eyes to objects ahead of the automobile windshield. There is increased attention to the secondary windshield glare.

Figures 7 through 12 illustrate a modified conical glare shield 100 which includes a horizontally disposed peeking slit 101. This slit commences at the apex of the cone, cutting out the apex, and extends through the body of the cone at an inclination substantially the same as the inclination of the surface of the cone at the underside thereof. This inclined surface prevents an operator from focusing his attention on the cone itself for reasons hereinbefore set forth.

This shield 100 is formed of soft collapsible material such as sponge rubber with a rigid rim portion 15' to provide for a ball receiving socket orifice 26 at the top of the unit. A ball 24 is mounted upon a rod 23 which depends from a slide 18 in a track 17 along the lower edge of a visor 11 and the ball is mounted in position in the socket 26 as hereinbefore described.

The upper side of the peeking slit 101 is formed by an inclined wall 102 which lies substantially parallel with the lower edge of the cone, and this wall 102 extends through the cone commencing at a point on the surface of the cone above the apex, thence slanting downwardly and terminating at its base at a point below its axis, it being understood that the cone is positioned with its axis being substantially horizontal and its base vertical, as illustrated in the drawing. The apex portion of this cone is removed as by a wedge-shaped cut into the cone. The top side of this cut is at the wall 102 and the bottom side of this cut is through a complementary plane at an edge 103 commencing at a point below the cone apex and slanting upwardly from each side thereof to intersect the wall 102 at opposed points which are approximately at median points of the cone. A flattened rigidifying section 104 may be formed along the bottom edge of the cone opposite the wall 102 to complete the slot.

Figure 9:
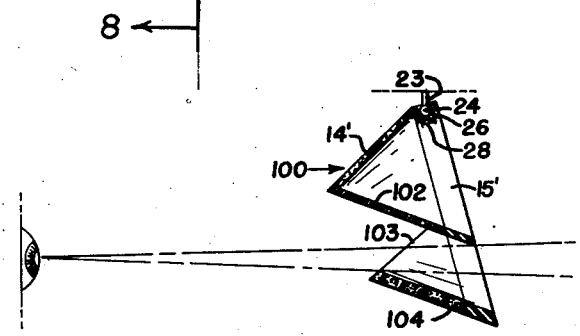
Figure 9 is a diagrammatic longitudinal section illustrating the use of the modified glare shield, including a representation of an individual's eye. with broken lines representing the extent of an individual's sight.
Figure 10:
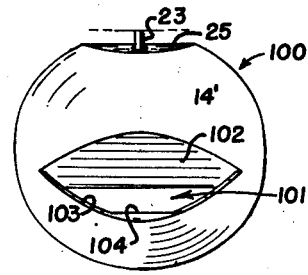
Figure 10 is an elevation view of the glare shield substantially as it would appear to the individual when viewing the shield as at Fig. 9.
Figure 11:
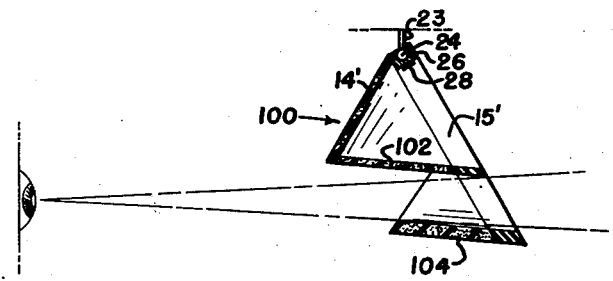
Figure 11 is a diagrammatic longitudinal section illustrating the use of the modified glare shield, including a representation of an individual's eye, with broken lines indicating the extent of the individual's sight, similar to Fig. 9 but with the shield at an alternate position.
Figure 12:
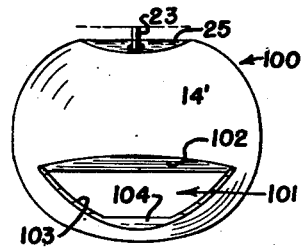
Figure 12 is an elevation view of the shield substantially as it would appear to the individual when viewing the shield as at Fig. 11.

The proportions and slope of the wall 102 and the size of the opening formed by the complementary cut 103 are such as to substantially close the slit 102 with the cone vertical but to provide an opening through the cone of varying width and depth as the cone is tilted. Figure 9 illustrates an intermediate degree of tilt with the slit partially open while Fig. 10 illustrates a further tilt with the slit fully open. It is obvious that in use the width of the slit may be varied in any manner desired.

While I have now described and illustrated my invention in detail, it is obvious that others skilled in the art can devise and built other alternate and equivalent constructions which are within the spirit and scope of my invention, and hence, I desire my protection to be limited, not by the constructions and details illustrated and described, but only by the proper scope of the appended claims.

I claim:

1. A glare shield adapted to be interposed between a light source and an observer viewing objects in the direction of the light source beyond the shield and comprising a conical body having a light absorbing surface and means for suspending the body at a point on the base edge with the base of the body being adapted to be oriented substantially transversely to a line of sight between the observer and light source and the apex point of the body being cantilevered therefrom toward the observer whereby the observer views the conical surface of the shield.

2. The glare shield defined in claim 1, wherein the body of the shield is formed as a resilient easily collapsible sponge-like material.

3. A glare shield adapted to be interposed between a light source and an observer viewing objects in the direction of a light source beyond the shield, and comprising a substantially conical body having a light absorbing surface, means for suspending the body at a point on the base edge with the base of the body being adapted to be oriented substantially transversely to a line of sight between the observer and the light source and the apex point of the body being cantilevered therefrom toward the observer whereby the observer views the conical surface of the shield, and an inclined peeking slit through the body with the slit being formed by inclined wall portions defining planes intersecting the cone and sloping with respect to the observer's line of sight and being substantially parallel with an inclined surface portion of the cone.

4. The glare shield defined in claim 3 wherein said suspension means include means for tilting the body to vary the visual width of the slit.

References Cited in the file of this patent

UNITED STATES PATENTS

| | | |
|---|---|---|
| 1,568,900 | Metcalf | Jan. 5, 1926 |
| 1,605,964 | Mapelsden | Nov. 9, 1926 |
| 1,835,833 | Williams | Dec. 8, 1931 |
| 1,941,032 | Knowles | Dec. 26, 1933 |
| 2,212,007 | Buchanan | Aug. 20, 1940 |
| 2,747,926 | Ralls | May 29, 1956 |

FOREIGN PATENTS

| | | |
|---|---|---|
| 567,958 | Great Britain | Mar. 9, 1945 |